United States Patent Office 3,312,015
Patented Apr. 4, 1967

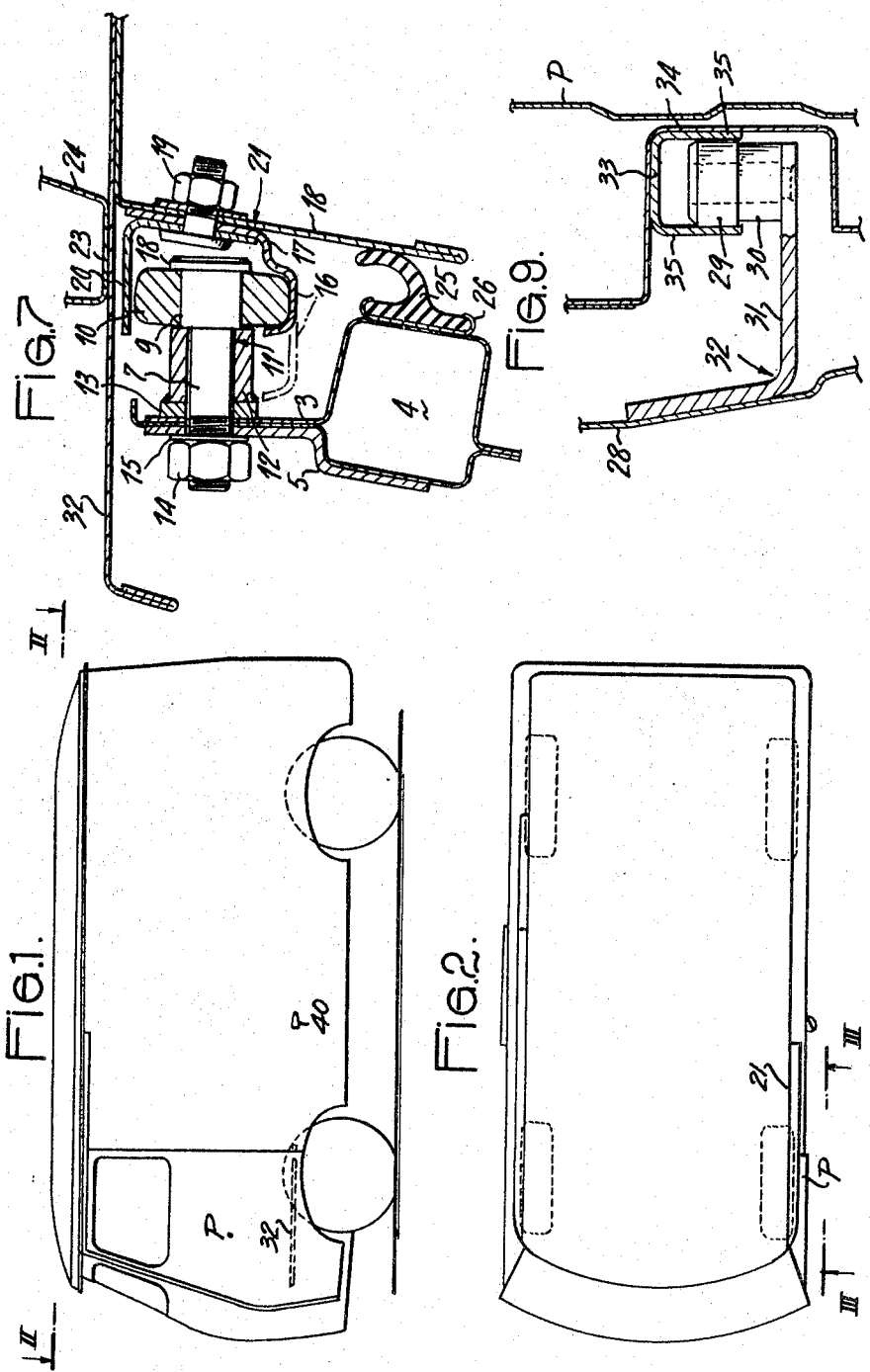

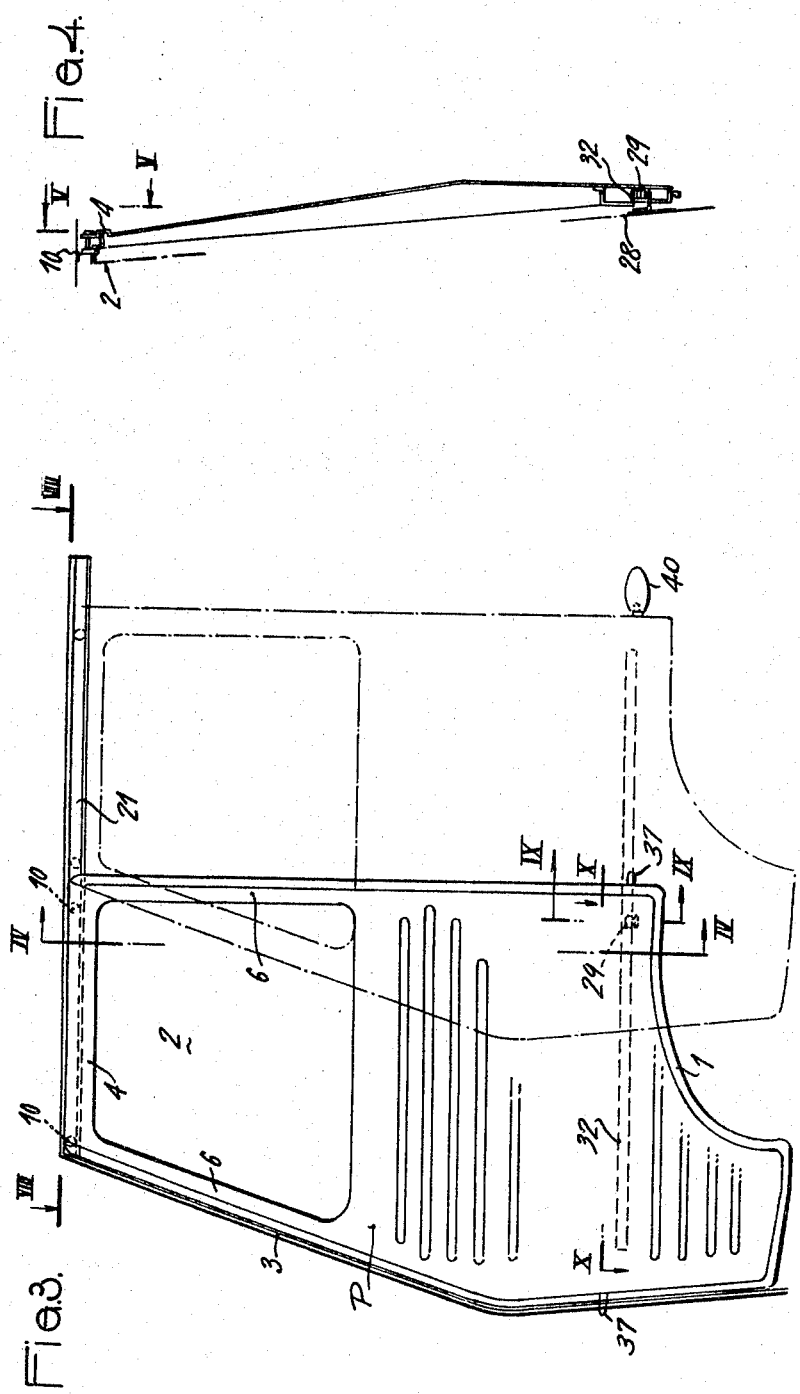

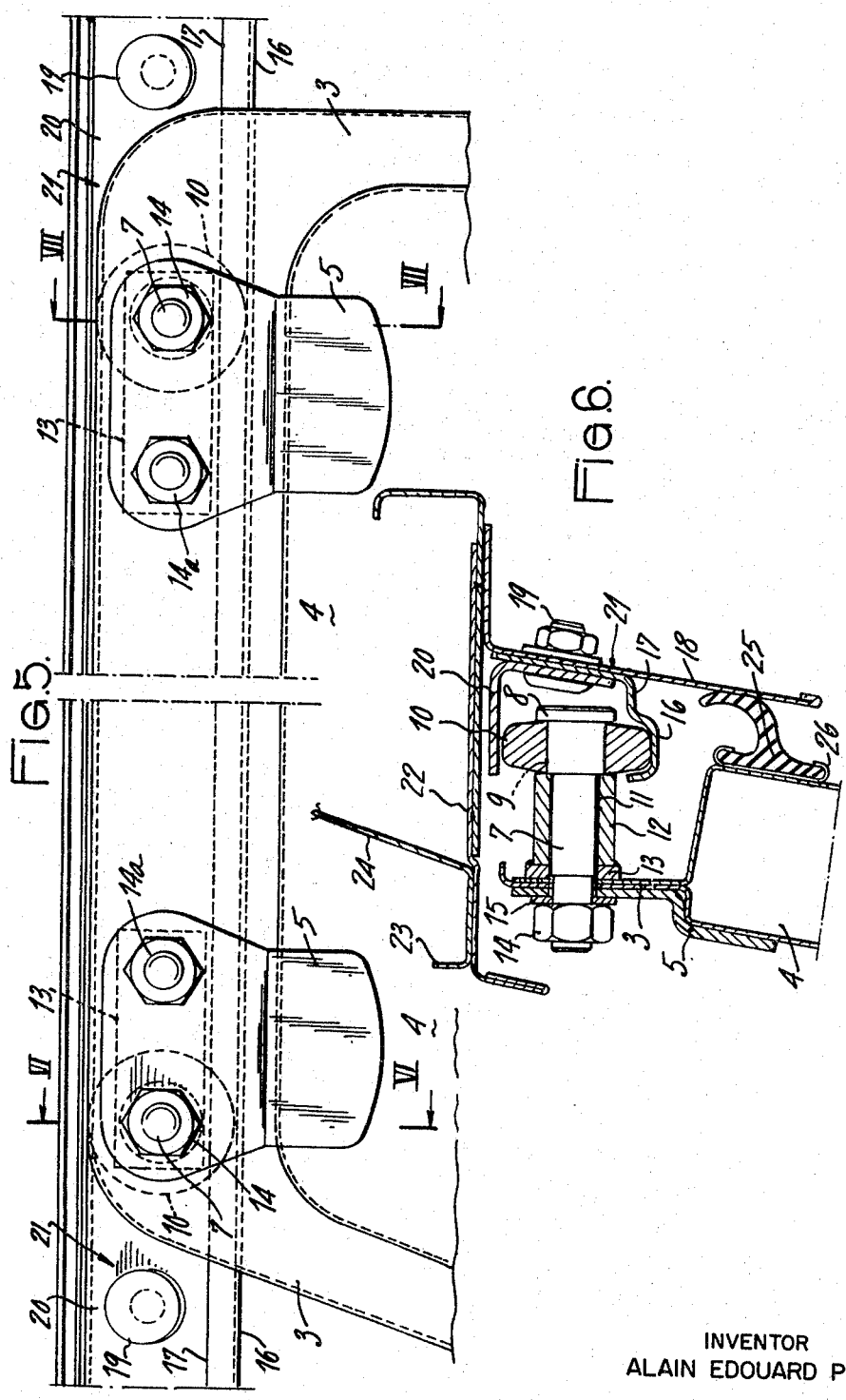

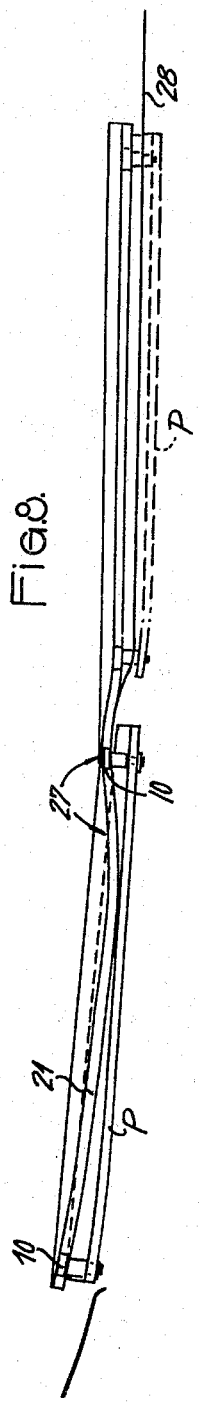
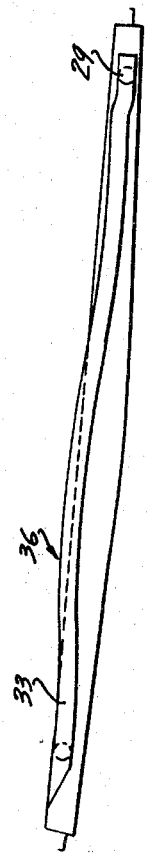
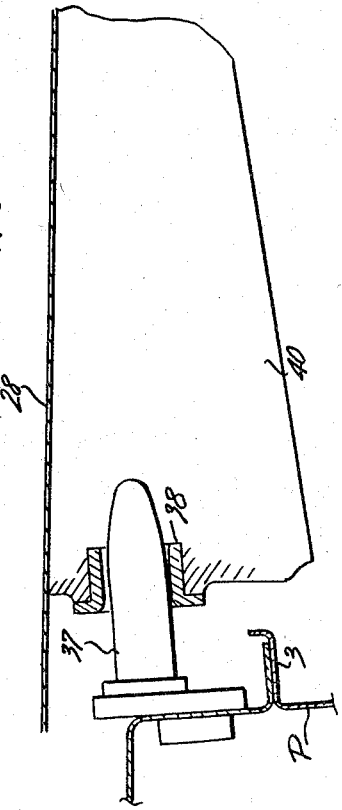
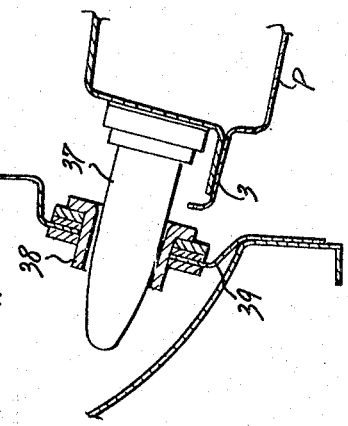
INVENTOR
ALAIN EDOUARD PLEGAT

3,312,015
SLIDING TYPE LATERAL DOOR, MORE PARTICULARLY FOR MOTOR-CAR BODY
Alain Edouard Plegat, Asnieres, Seine, France, assignor to Societe Anonyme des Usines Chausson, Asnieres, Seine, France, a company of France
Filed Feb. 23, 1965, Ser. No. 434,348
Claims priority, application France Mar. 20, 1964, 968,138, Patent 1,397,470
4 Claims. (Cl. 49—213)

The sliding lateral doors provided in some motor vehicles are sometimes mounted so as to slide either externally or internally of the vehicle body.

To provide in this manner a motor vehicle having an advanced cabin, it is not always possible to provide a sliding door within the body owing to the presence of the wheel recesses which usually lie behind said door and which may be designed so as to extend to a relatively low level, more particularly to cover and conceal a running board when said door is closed. Further, it was up to the present difficult to provide a door adapted to slide externally of the body and capable firstly, to be perfectly in alignment with the wall of the latter when in a closed position and, secondarily, to extend in a parallel relationship with said wall when in an open position.

The present invention solves the above-mentioned problem in providing a new sliding lateral door, more particularly for vehicles body having advanced cabins, said door being so designed as to also conceal, when in a closed position, the running board giving access to the cabin.

According to this invention, the externally sliding lateral door, constituted by two metal sheets stamped and connected by welding, is provided on the upper edge thereof with two upper rollers housed and guided in a rail externally added to the vehicle body, said rail being shaped so that to align the door with said body when in a closed position, while disposing said door in a parallel relationship with said body when in an open position, the guiding of said door being further caused by a fixedly mounted rotatable roller which is fast to the rear post of the door frame of the body and is engaged in a co-operating U-shaped or channel slide-way added to the inside face of the door, said slide-way having a longitudinal contour adapted to transversely displace the lower part of the door, so that such displacement corresponds to a displacement which is caused by a double curvature formed longitudinally on the rail which supports the upper rollers.

Other characteristics and advantages of the invention will be revealed when reading the following detailed description.

The drawings show an embodiment of the object of the invention, in an illustrative and by no means limitative manner.

In the drawings:

FIGURE 1 is a longitudinal elevation of a vehicle having a lateral door according to this invention.

FIGURE 2 is a plan view, taken along the line II—II of FIGURE 1.

FIGURE 3 is a side elevation of the door according to this invention, taken at a larger scale along the line III—III of FIGURE 2.

FIGURE 4 is a cross-section taken along the line IV—IV of FIGURE 3.

FIGURE 5 is a cross-section taken along the line V—V of FIGURE 4.

FIGURES 6 and 7 are fragmentary cross-sections taken along the lines VI—VI and VII—VII of FIGURE 5, respectively.

FIGURE 8 is a plan view, at a smaller scale, taken along the line VIII—VIII of FIGURE 3.

FIGURE 9 is a cross-section, at a larger scale, taken along the line IX—IX of FIGURE 3.

FIGURE 10 is a plan view, at a smaller scale, taken along the line X—X of FIGURE 3.

FIGURES 11 and 12 are sectional views, at a larger scale, showing two of the particular members of the door according to this invention.

FIGURES 1 and 2 show the arrangement of a door, according to the present invention, in a delivery van comprising an advanced cabin, but it is evident that said door could as well also equip other vehicles of a different kind.

According to FIGURES 1, 2 and 3, the door P, which is constituted in a known manner by two stamped and contoured metal side panels, which are made integral one with the other, is adapted so as to conceal, when in a closed position, the running board giving access to the vehicle cabin. Said panels are, moreover, stamped so as to present, when they are assembled, on the one hand, a concave recess 1 adapted to house the vehicle front wheels and, on the other hand, in the upper part thereof a frame 2 in which one or more windows can be mounted.

As shown in FIGURES 3 to 7, inclusive, a peripheral lip 3 defined by the junction of the recited side panels is reinforced in its part which lies in the extension of the upper tubular cross member by two iron sections 5 which are added to the external face of the door, substantially at the level of two posts 6 of frame 2.

Each iron section 5 is adapted to support a bolt 7 member, in which is defined, from the head 8 thereof, a shoulder 9 on which is slidingly threaded a roller 10, advantageously made from a suitable rigid plastic material. Said bolt 7 comprises, moreover, from shoulder 9, a reduced diameter bearing part 11 which is adapted to receive a tubular strut or spacer 12 bearing upon the flange formed by said shoulder 9. The tubular spacer member 12 bears also upon a backing plate 13 which abuts against lip 3 by means of a nut 14 screwed upon the externally threaded end part of the bolt extending through both the lip 3 and the iron section 5, whereby to bear against the latter through a washer 15. Said backing plate 13 is, in addition, radially maintained with respect to bolt 7 by a bolt 14a also extending through lip 3 and iron section 5.

Each roller 10 is housed in a roller and guiding track 16 defined by an iron section 17 added to the door frame 18 of the vehicle body by means of bolts 19. The latter act also to maintain another L-shaped iron section 20, the horizontal wing of which limits the vertical clearance amplitude of said roller, whereby to avoid an escaping of the latter from a rail 21 constituted by the iron section 17 and the iron section 20.

As shown in FIGURES 6 and 7, the roller and rail unit is disposed under a sole plate 22 integral with the vehicle body and upon which is fitted the upright edge 23 constituting the gutter of the roof 24. Said sole plate allows to simultaneously protect the rollers, the rail and the door P, the water tightness of which, with respect to the frame 18 of the vehicle body, is insured by a sealing element comprising a lip 25 and secured in position by a clamp 26 made fast to the inner face of the door.

In addition to the particular transverse profile provided to guide vertically and transversely the roller 10, said rail 21 is besides longitudinally contoured, as shown in FIGURE 8, so as to present, in the substantially medial part thereof, a double curvature 27, which is adapted, during the lateral sliding of the door, to transversely displace the door, such a displacement causing e door, when in a closed position, to be aligned with e body wall 28, and causing the door, when in an en position (as schematically shown in dash lines), be disposed parallel and externally to said wall 28.

Thus, it can be seen that above-described arrangement lows to obtain an outside lateral sliding of the door hich, while concealing the access running board when a closed position, does not increase the overall width f the vehicle. In addition, such an arrangement may e easily realized, in spite of the presence of the wheel cesses, and it does not reduce the inside effective space f the vehicle, as in the case for the doors which slide side the vehicle body.

In order to avoid any transverse swivelling of the rollrs 10 carried by rail member 21, the door is also guided y a stationary lower roller 29 idly rotating on a pivot 0 which protrudes from the horizontal flange 31 of an on section 32, which is added to the vehicle body near e door frame rear post. The stationary roller is proided to slide in a channel slide-way 33, secured e.g. as y welding, in a recess 34 defined by the inside lateral all of the door. Said channel slide-way 33 is mounted a recess 34 so that the parallel flanges 35 of the slide ay fit the roller 29, whereby to insure a guiding of the oor which complements that of the rail 21. This guidg is, moreover, complemented by the longitudinal prole of slide-way 33, which presents (FIG. 10), substanally in the central part thereof, a camber 36 provided transversely offset, during its displacement upon the tationary roller 29, the lower part of the door by an xtent corresponding to the offset extent of the upper art, which is caused by the double curvature 27 of the ail member 21.

So that the door be maintained in its utmost opening nd closing positions, and also to avoid any vibration, the loor is provided, on the substantially vertical edgeways nembers but internally to the recited peripheral lip 3, vith protruding pins 37, which are adapted to enter rings 8 made from a flexible material and which are respecively carried by the edgeways member 39 of the vehicle ody door frame and by at least a shoe 40 added to the ody wall 28 and having a reentrant relationship relaively to the door frame rear post.

The present invention is not limited to the embodiment hown and described in detail, since various changes may e brought thereto without going outside of its scope. n particular, it may be advantageous to provide pads nade from a flexible material and added both upon the edgeways member 39 and the shoe or shoes 40, so that aid pads act as stop elements and damp the movement of the door when it is led to its utmost opening and closing positions.

I claim:

1. In a motor vehicle having a laterally facing door opening, an elongated overhead guide rail extending along the side of said vehicle above said opening, said guide rail having a curvature portion including inwardly curved sections adjacent the rear and front of said door opening and an outwardly curved section at the middle of said door opening, an upwardly extending stationary guide post fixed at the bottom and rear of said door opening in aligned relationship with said rear curved section of said guide rail, a door slidable along said guide rail between a closed position across said opening and an open position along the side of said vehicle to the rear of said door opening, a pair of upper rollers mounted on said door for supporting said door from above on said guide rail, a U-shaped guideway fixed to the bottom of said door and facing downwardly to guidingly receive said post, said guideway having an intermediate contour section with a curvature away from said door corresponding to said outwardly curved section of said track, whereby said door is transversely shifted away from the side of said vehicle during the opening and closing operations to facilitate the same and shifted toward said side when said open and closed positions are approached.

2. The combination of claim 1 wherein is further provided two reinforcement plates adjacent the upper edge of said door for supporting each of said rollers independently, and said guide rail comprises a lower U-shaped channel contoured so as to insure, by the rolling track defined thereby, a transverse guiding of said rollers and an upper L-shaped section provided to insure a vertical guiding of said rollers, said U-shaped channel and Lshaped section being mounted to said body so that a horizontal extension of the latter protects said rollers and rail.

3. The combination of claim 1 wherein is provided an idle roller mounted on said guide post to engage said guideway, said guide post being mounted on the horizontal wing of an L-shaped section secured to said vehicle, said guideway being secured on the inner side of the door in a recess, whereby the lateral wings of said recess serve to protect the idle roller.

4. The combination of claim 1 wherein is further provided a centering and locking pin on each side of the door, elastic seating rings carried by said vehicle for cooperation with the respective centering and locking pins in said open and closed positions of said door, said pins and said rings being mounted to an angle with respect to said guide track and said guideway whereby said pins are lockingly cammed into said rings when said door is in said open and closed positions.

References Cited by the Examiner

UNITED STATES PATENTS

| 400,562 | 4/1889 | Goelet | 49—213 |
| 2,656,215 | 10/1953 | Harvey | 49—411 |

FOREIGN PATENTS

| 888,870 | 2/1962 | Great Britain. |
| 939,546 | 10/1963 | Great Britain. |
| 953,029 | 3/1964 | Great Britain. |

HARRISON R. MOSELEY, *Primary Examiner.*

KENNETH DOWNEY, *Examiner.*